W. S. LENNON.
CAR COUPLING.
APPLICATION FILED JUNE 16, 1909.
984,946.
Patented Feb. 21, 1911.
2 SHEETS—SHEET 1.
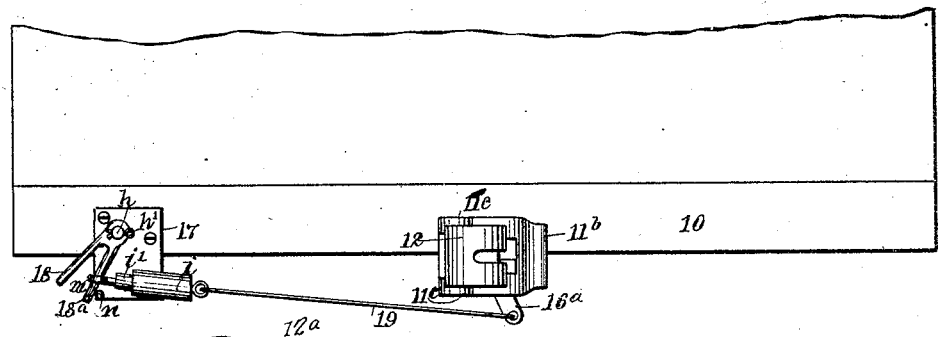
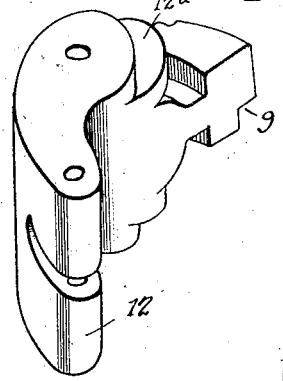
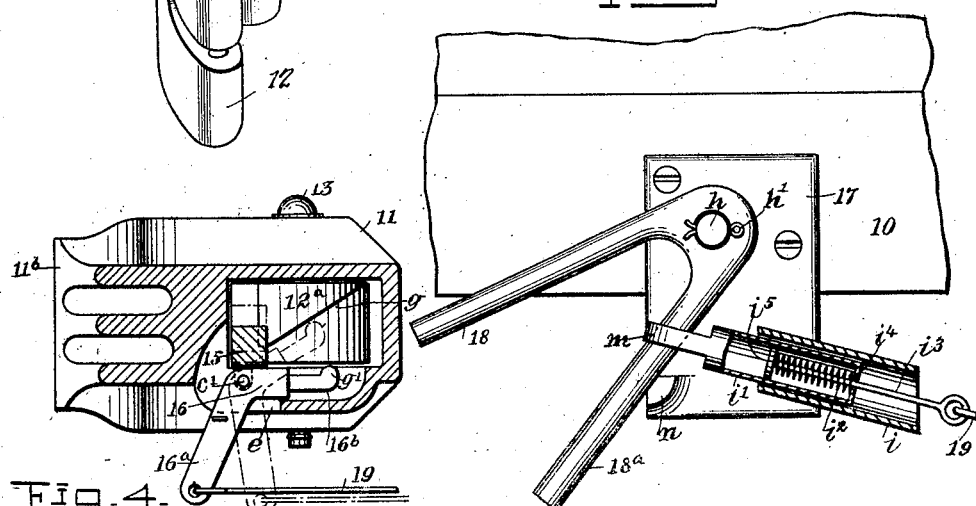
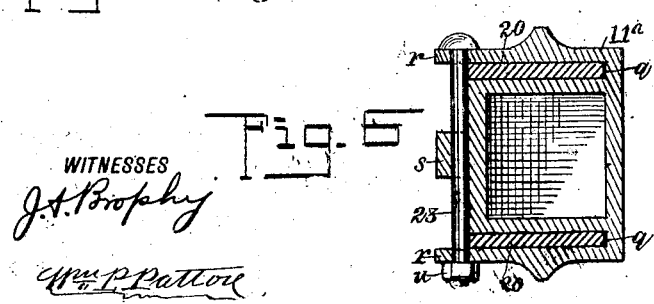
WITNESSES
J. A. Brophy
Wm. P. Patton
INVENTOR
Watson S. Lennon
BY Munn & Co
ATTORNEYS

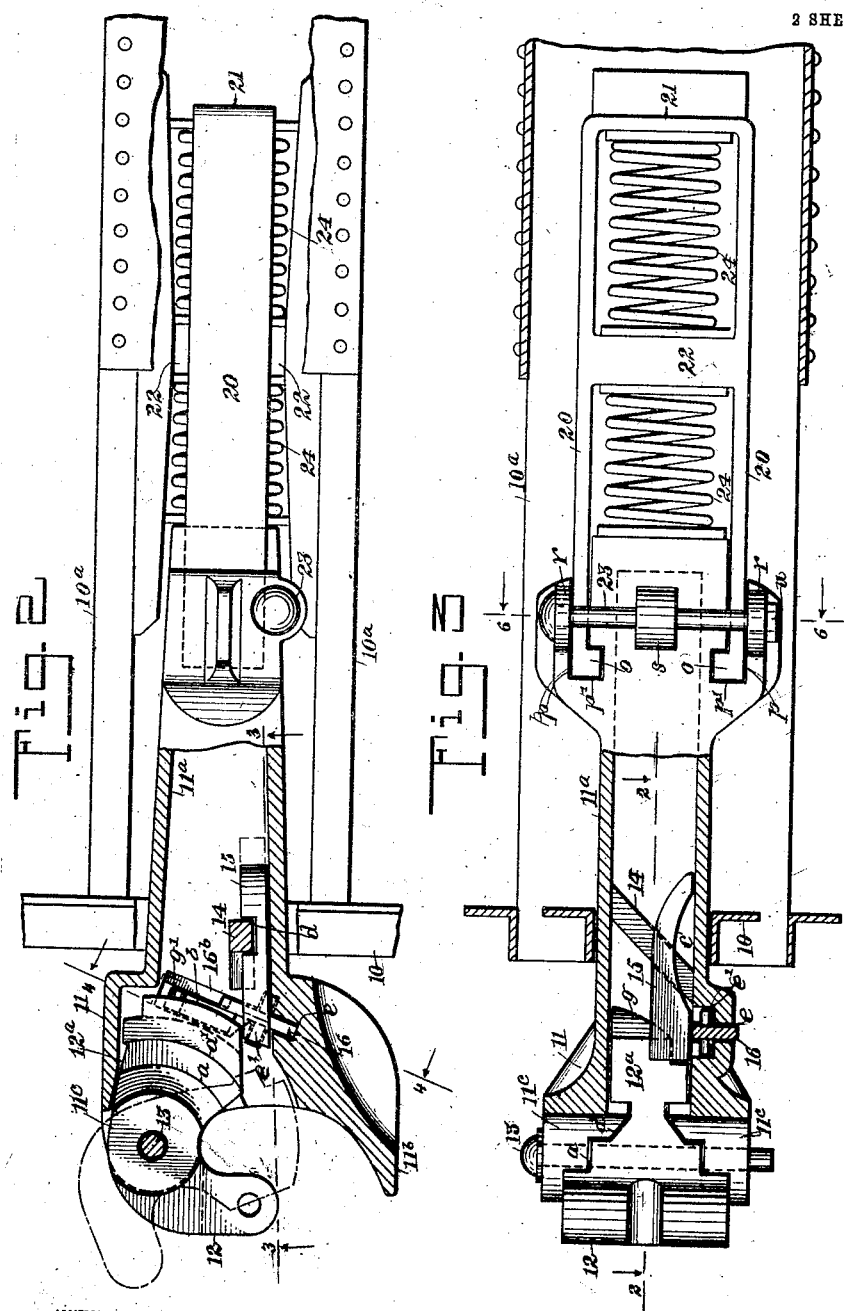

UNITED STATES PATENT OFFICE.

WATSON SIMPSON LENNON, OF TUCSON, ARIZONA TERRITORY.

CAR-COUPLING.

984,946.

Specification of Letters Patent.   Patented Feb. 21, 1911.

Application filed June 16, 1909. Serial No. 502,463.

*To all whom it may concern:*

Be it known that I, WATSON SIMPSON LENNON, a citizen of the United States, and a resident of Tucson, in the county of Pina and Territory of Arizona, have invented new and useful Improvements in Car-Couplings, of which the following is a full, clear, and exact description.

This invention relates to car couplings of the Janney type and has for its object to provide novel means for releasing and opening the knuckle of a car coupling of the type indicated, from a point near the side of a car whereon the coupling is placed; and a further object is to provide a spring holder for the car coupling, which is of novel construction, and novel means for detachably connecting the spring holder with the rear end of the coupling draw-bar, whereby said spring holder is adapted for convenient and quick detachment from the car coupling, and its replacement in a like manner facilitated, if it is accidentally broken or rendered insecure from any cause.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is an end view of a car body, a Janney car coupling thereon, and a front view of the improved means for opening the knuckle jaw of said coupling mounted on the car and connected with said jaw; Fig. 2 is a broken plan view of a car bottom frame, and a partly sectional plan view of a car coupling having the improvements and mounted on the car frame, the section being taken substantially on the line 2—2 in Fig. 3; Fig. 3 is a partly sectional side view, of the car frame and coupling thereon shown in Fig. 1, the section being taken substantially on the line 3—3 in said view; Fig. 4 is a transverse sectional view substantially on the line 4—4 in Fig. 2; Fig. 5 is an enlarged fragmentary end view of an end wall for a car body, and a front side view of a detail of the invention mounted thereon; Fig. 6 is a transverse sectional view of the draw-bar for a Janney car coupling and of a spring holder secured on the draw-bar, the section being substantially on the line 6—6 in Fig. 3; and, Fig. 7 is a perspective view of the knuckle.

While the features of improvement may be embodied with a car coupling of the Janney type, applied for coupling together passenger cars that traverse a railroad, such couplings having the improvements are particularly well adapted for the coupling together of freight cars and are illustrated as so applied.

In the drawings, 10 represents the front transverse timber or beam, and 10ᵃ, 10ᵃ, longitudinal stringers or timbers that are portions of the bottom frame for a frieght car.

The car coupling shown to illustrate the application of the features of the invention, comprises a draw-head 11 and draw-bar 11ᵃ that is preferably formed integral with the drawhead. The drawhead is cast into form along with the draw-bar, of a suitable metal, and as appears in Figs. 2, 3 and 4, the drawhead and integral draw-bar are rendered hollow, so as to reduce their weight and adapt the drawhead for reception of working parts that will be explained.

A horn 11ᵇ is integrally formed as usual on the normally right side and front corner of the drawhead, and two spaced lugs 11ᶜ, are formed on the opposite side wall and front corner of said drawhead. Preferably the lugs 11ᶜ are formed on their inner opposite sides having offset shoulders $a$, $a'$ thereon which are of a like form. The knuckle that is a complementary detail for the drawhead 11, consists of a transverse jaw 12 that fits loosely between the lugs 11ᶜ and a tail piece 12ᵃ, having its upper and lower sides offset to correspond with the offset shoulders $a$, $a'$, the free inner end of the tail piece terminating in a slightly convexed wall $b$. The knuckle is rotatably secured between the lugs 11ᶜ by a pin 13 or any other suitable means, whereby the jaw 12 and tail piece 12ᵃ are permitted to rotate for opening the knuckle, as is shown by dotted lines in Fig. 2.

The improved means for locking the knuckle in closed position and for releasing said knuckle are essentially embodied in the construction of the parts that will be described.

In the forward portion of the draw-bar 11ᵃ, a guide post 14 is positioned, which inclines upward and rearward, said bar, which is secured upon the top wall and the lower wall of the draw-bar by its ends, being located near to and parallel with the inner side of the side wall of the draw-bar which is immediately at the rear of the horn 11$^b$. A slide block 15 is employed for locking the tail piece of the knuckle in place when the knuckle is closed, said slide block consisting of a metal billet having flat parallel sides, and a concavity $c$ formed in the lower side thereof. In the side of the slide block 15 that in service is nearest to the post 14, a channel, $d$ is formed which loosely receives the post, and said channel has such inclination as will permit the slide block to slide upward in a plane parallel with the bottom surface of the draw-bar. The position of the guide post 14 with relation to the rear portion of the tail piece 12$^a$ and the length of the slide block 15 forward of the post, is such that when the slide block is seated upon the inner bottom surface of the draw-bar 11$^a$, the forward portion of said slide block will lap upon the adjacent side of the tail piece when the knuckle is closed, and thus hold the knuckle in such a position, as is shown in Figs. 2 and 3.

It will be understood that if the slide block 15 is pressed upon on its lower side, it will move upward and rearward, which will remove the forward end of the block from engagement with the side of the tail piece 12$^a$ and permit the knuckle to be rotated to open the same.

The means for lifting the slide block 15 and subsequently moving the tail piece and jaw of the knuckle into open position, comprises the following details. In the bottom wall of the drawhead 11 a slot $e$ is formed, which extends diagonally from the side wall of the drawhead on which the horn 11$^b$ is formed, across said bottom wall and rearward, as is clearly shown in Fig. 2, said slot being located behind and adjacent to the rear end wall of the tail piece 12$^a$ when the knuckle is closed. As shown clearly in Fig. 4, a rock arm 16 is employed as a detail of the knuckle releasing means, said arm consisting of a flat bar bent edgewise at an obtuse angle, and pivoted at $c^1$ near said angle within the slot $e$, so that a depending member 16$^a$ of the rock arm extends downward and rightward from the slot, as indicated in Figs. 1 and 4. An extension 16$^b$ is formed or secured on the opposite end of the obtuse angular rock arm 16, and normally occupies a horizontal plane below the lower surface of the tail piece near its rear end. It will be seen at $g$ in Fig. 3, that the bottom wall of the tail piece at and near its rear end is inclined from the upper edge thereof at the left side of the tailpiece downward and to the right, this inclined face being convexed slightly, and it may here be explained that the rounded end $g'$ which is offset from the extension 16$^b$ is disposed below said inclined surface so that it will press thereon when the depending member 16$^a$ of the rock arm is drawn leftward, the frictional engagement of the end $g'$ holding said member where it is positioned by the movement of the arm 16. As shown in Figs. 1 and 5, a bracket plate 17 is secured on the end wall of the car body adjacent to its left side, and on said bracket plate a lever is pivoted, said lever consisting of two arms 18, 18$^a$, that are joined together at one end of each, and pivoted at $h$ where they merge together, from which point the arms diverge from each other at an acute angle, the lever being retained in place by a cotter key $h'$. A spring holder in the form of a cylindrical casing $i$ is secured on the bracket plate 17, and extends toward the depending member 16$^a$ of the rock arm 16. In the holder $i$ a spring box $i'$ is slidably held, one end thereof that projects toward the arm 18$^a$ having a loop $m$ thereon which loosely receives said arm. In the box $i'$ a coiled spring $i^2$ is located which encircles an end portion of a slide rod $i^3$ which is inserted through the perforated end wall $i^4$ of the box $i'$ and is attached at its inserted end centrally upon a disk $i^5$ that is thus slidably supported in the spring box. Between the outer end of the slide rod $i^3$ and the depending member 16$^a$ of the rock arm 16, a connecting rod 19 is extended and loosely secured at its ends thereto, the expansion of the spring $i^2$ keeping the connection taut, but not being of sufficient strength to lift the dog. The weight of the connection between the arms 18$^a$ and 16$^a$ is supported by the impingement of the arm 18$^a$ upon a projection $n$ on the bracket plate 17 at its left lower corner.

In service, the closed knuckle of the car coupling may be safely opened by one standing at the side of the car, by pulling on the lever arm 18, which will rock the arm 16$^a$ leftward, and the other member of the rock arm 16 upward, which will through the described connections lift the slide block 15, thus removing it from the path of the tail-block 11$^a$. The extension 16$^b$ when rocked upward sufficiently, impinges upon the inclined rear end wall $g$ of the tail piece 11$^a$ and following the release of the slide block 15, pushes said tail piece to the right and the knuckle into closed position.

It will be evident from an inspection of Figs. 2, 3 and 4 that when the elbow lever 16 is moved to lift the dog 15, the said dog will be moved rearwardly as well as upwardly and out of contact with the tail piece of the knuckle, permitting the knuckle to open. When now, the lever is moved slightly farther, the extension $g'$ of the elbow lever engages the inclined surface $g$ of the tail piece, and opens the knuckle. It is not necessary for the brakeman to open the knuckle manually as in the usual form of coupling.

It will be seen that upon closure of the knuckle in effecting a coupled connection with another car coupling of the same type, the slide block 15 that had been maintained in a raised position will be released, slide down the guide post 14, and lap at its front end upon the side of the tail piece 11ª, that is adjacent thereto, thus securing the knuckle in closed condition.

In the usual construction for a car coupling of the Janney type, such a coupling is located at the transverse center of the car frame, and extends from the cross timber or beam at the end of the frame rearward between two spaced timbers such as 10ª, the coupling draw bar being rigidly secured at and near its rear end, on the forward end of a looped frame, that supports cushion springs thereon which absorbs shocks to which the coupling is subjected in service. As the attachment of the spring holder for an ordinary Janney car coupling, is rigidly secured upon the rear end of the coupling drawbar, it is a task that requires considerable time and hard labor to remove the spring holder in case the springs break, or the spring holder is worn out or damaged by accident. A feature of the present invention provides novel, simple and practical means for detachably securing a spring holder on the rear end of the drawbar for the improved car coupling, which enables the speedy and convenient removal of the spring holder and springs from the draw bar, and a replacement of the same with the expenditure of but little time and labor, as will be described.

It will be seen in Figs. 1 and 3, that the spring holder consists of an elongated metal frame having parallel upper and lower side walls 20, 20, that are spaced apart by the rear end wall 21, an intermediate cross bar 22. At the forward ends of the walls 20, 20, an inwardly extended lug $o$ is formed on each, which lugs are disposed oppositely, and preferably are of an equal length, and a width equal with that of the walls they are formed on. On the rear end of the drawbar 11ª the body thereof is increased in vertical width, and in the widened portion two spaced slots $p$, $p$ are formed, which are parallel with each other, and extend from one side of the drawbar across the same to a point near the opposite side thereof, as shown at $q$ in Fig. 6. The space between the slots $p$ is equal with that between the upper and lower members 20, 21 of the spring holder, and at the forward side edge of each slot $p$ a recess is formed in the lower side thereof as shown at $p'$ in Fig. 3. The vertical width of each slot $p$ is such that they will respectively receive a member 20, 20, of the spring holder, which may be inserted laterally thereinto, the lugs $o$ passing into the recesses $p'$ as shown in Fig. 3.

On each of the top and bottom flanges 22 produced by formation of the transverse slots $p$, a laterally projected ear $r$ is formed, said ears being respectively disposed adjacent to the open end of a slot $p$ and midway between the ears a boss $s$ is formed on the side of the drawbar. The ears $r$ and boss $s$ are in alinement and oppositely perforated for the insertion of a keeper bolt 23, therethrough, said bolt on its ends having a head, and a thread respectively, the latter receiving a nut $u$ which retains the bolt in place and in contact with the side edges of the members 20 on the spring holder.

It will be understood that the insertion of the spring holder members 20, 20, and lugs $o$ laterally and fully into the slots in the drawbar, adapts the spring holder as an entirety to occupy the space between the timbers 10ª and receive springs 24, that are to be supported thereby for cushioning the impact of percussion on the drawhead, or the draft strain that the car coupling is subjected to.

At any time it is necessary, the improved spring holder that has been described, may be quickly detached by a removal of the keeper bolt 23, and release of the rear end of the spring holder from the timbers 10ª, below which the latter is now inclined, which will permit said holder to be slidably removed laterally from the slots $p$ and after repairs are completed, be replaced quickly and secured by means of the keeper bolt 23.

It is to be understood that the present invention resides in the provision of the improved means for locking and releasing the tail piece of the coupling knuckle, and the improved means for detachably connecting the spring holder for the coupling with the drawbar thereof.

Other details that are preferably used in the construction of the improved car coupling, are not claimed in this device, and are subject to change as may be found expedient in service.

Having thus described my invention, I claim as new, and desire to secure by Letters Patent:

1. A car coupling comprising a draw head, a draw bar in rear of the draw head, an inclined guide bar supported in the draw bar and inclining rearwardly from its lower to its upper end and spaced at its outer side away from the adjacent wall of the draw bar, a knuckle pivoted to the draw head and having a tail piece provided at its rear side with a downwardly facing inclined surface, a dog for engaging the tail piece for locking the knuckle in closed position, said dog fitting and operating between the inclined guide bar and the adjacent wall of the draw head and having in its side next the guide bar a slot receiving the said guide bar whereby as the dog is lifted it will move rearwardly and be moved thereby out of engagement with the tail piece of the knuckle and an operating lever having an arm engaging below the dog to lift the same and having an extension arranged to engage beneath the forwardly facing inclined surface of the knuckle whereby the continued movement of the said lever will first release the dog from engagement with the knuckle and will then positively open the knuckle, substantially as set forth.

2. In a car coupling, the combination with a draw head, and a knuckle pivoted thereto and provided with a tail piece, of a dog engaging the tail piece to lock the knuckle in closed position, a bar arranged within the draw head, and inclining backwardly and upwardly away from the knuckle, the dog being mounted for sliding movement on the bar, whereby when the dog is lifted it will be moved backwardly out of contact with the tail piece, an elbow lever for moving the dog, said lever having an extension, and the tail piece having an inclined surface for engagement by the extension after the dog has been moved out of engagement with the knuckle, whereby a continued movement of the lever in the same direction will open the knuckle after moving the dog out of engagement therewith.

In testimony whereof I have signed my name to this specification in the presence of two subscribing witnesses.

WATSON SIMPSON LENNON.

Witnesses:
 JEREMIAH CONNOR,
 BENTON DICK.